3,238,179
PROCESS FOR IMPROVING POLYOLEFINS BY INCORPORATION OF CONDENSATION PRODUCTS OF ISOVINYL PHENOL AND ACETONE AND ORGANIC POLY SULFIDES
Claus Heuck, Hofheim, Taunus, Otto Mauz, Frankfurt am Main, Jakob Winter, Hofheim, Taunus, and Felix Schulde, Neuenhain, Taunus, Germany, assignors to Farbwerke Hoechst Aktiengesellschaft vormals Meister Lucius & Brüning, Frankfurt am Main-Hoechst, Germany, a company of Germany
No Drawing. Filed Feb. 18, 1963, Ser. No. 259,438
Claims priority, application Germany, Aug. 6, 1959, FW 29,113
4 Claims. (Cl. 260—45.95)

The present invention relates to a process for improving polyolefins.

It has already been proposed to stabilize polyolefins so as to improve their age-resisting properties. To achieve this, the polyolefins are admixed with phenol derivatives which are used in admixture with thioethers that may carry substituents.

The thioethers used in such process are sulfides which may also contain several sulfur atoms per molecule. The sulfur atoms are, however, separated from one another by alkyl groups.

We have now found that polyolefins can be stabilized so as to improve their age-resisting properties by admixing those polyolefins with phenol derivatives in admixture with polysulfides which contain hydrocarbon radicals. The mixtures of phenol derivatives with polysulfides improve the age-resisting properties of those polyolefins and their resistance to ultraviolet light.

Those aliphatic polysulfides which are used in combination with phenol derivatives can be prepared in simple manner. Thus, for example, the dialkyl disulfides are prepared in known manner by oxidizing mercaptanes. Dialkyltrisulfides and dialkyltetrasulfides are obtained by reacting mercaptanes with monosulfurdichloride or disulfur-dichloride or, alternatively, by reacting alkyl chlorides with sodium polysulfides. In addition to the aforesaid dialkyl polysulfides which correspond to the general formula R—S$_n$—R, wherein R represents a hydrocarbon radical containing 4–25 carbon atoms and $n$ is a whole number of 2–4, there may also be used those dialkyl polysulfides of the above formula, wherein R represents an aralkyl or aryl group.

The following compounds have, for example, been prepared

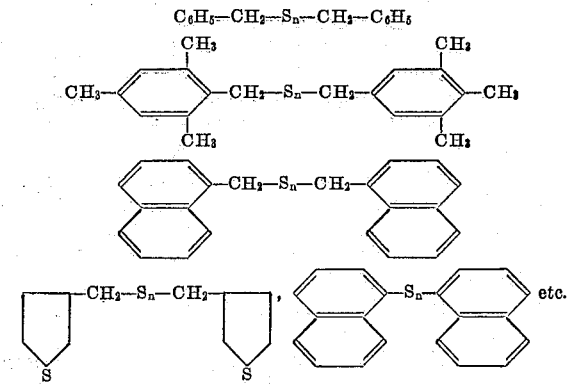

wherein $n$ is a whole number of 2–4.

The proportion in which the antiager is used generally varies within the range of 0.001% and 5%, advantageously 0.05% and 1%, in the case of shaped structures which are normally stressed. The two components, i.e. phenol derivative and polysulfide, should be used in a ratio of 5:1 parts by weight to 1:5 parts by weight, advantageously in a ratio of 1:1.

As phenolic component there may be used more especially: phenol, alkyl phenols, dialkyl phenols, wherein the alkyl radical may contain up to 12 carbon atoms, hydroquinone, resorcinol, phloroglucine and condensation products of phenol or alkyl phenols with aldehydes, formaldehyde, acetaldehyde, propionaldehyde or ketones, such as acetone. The aforesaid phenolic compounds are reacted with camphene in the presence of borofluoride-glacial-acetic acid so as to obtain corresponding terpene phenols. During that process, the camphene is rearranged and an isobornyl-compound is obtained. In addition to camphene, dipentene may be used, whereby similar types of compounds are obtained.

The tables below indicate the times until embrittlement at 140° C. for low pressure polypropylenes which always contain 0.5% of the above stabilizer combination in the ratio of 1:1. The time until embrittlement should be understood as indicating the time in days until a 1 mm. thick polyolefin pressed sheet fails on being bended.

In accordance with this invention, the polyolefins are first prepared and then stabilized by admixing them with the stabilizer components. It is, however, especially advantageous to add those stabilizer components during the work up of the polyolefins.

As polyolefins which can be stabilized by the process of this invention there may be mentioned more especially those which have been prepared by the Ziegler-type low-pressure polymerization process (cf. Raff-Allison, "Polyethylene," 1956, pages 72–81). As such compounds there may be used Ziegler-type low pressure polyethene, -propene, -butene or copolymers prepared from the corresponding monomers. Here, the polymeric compounds are formed from an olefin in the presence of a catalyst prepared from a mixture of an organo metallic compound and a compound of a heavy metal selected from the Group of IVB to VIB of the Periodic Table.

Table 1

Stabilizer combination of 0.25% polysulfides and 0.25% of a condensation product of nonyl phenol and acetone= phenolic component (ph. c.=abbreviation for phenolic component).[1]

| 0.25% polysulfide costabilizer plus 0.25% ph. c. | Total concentration, percent | Embrittlement time in days at 140° C. | Color of press plate after annealing |
|---|---|---|---|
| 0.25% bis-(octadecyl)-disulfide plus 0.25% ph. c. | 0.50 | 53 | Colorless. |
| 0.25% bis-(octadecyl)-trisulfide plus 0.25 ph. c. | 0.50 | 56 | Do. |
| 0.25% bis-(octadecyl)-tetrasulfide plus 0.25% ph. c. | 0.50 | 60 | Do. |
| 0.25% bis-(octadecyl)-monosulfide plus 0.25% ph. c. | 0.50 | 40 | Do. |
| Condensation product of nonyl phenol and acetone (without addition of sulfide) or polysulfide. | 0.25<br>0.50 | 3<br>5 | |

[1] Total concentration: 0.5%.

The above table shows that increasing the sulfur content of dialkyl polysulfides leads to increased stability. Similar results are obtained, when the octadecyl radical is replaced by the dodecyl radical. When lower alkyl radicals are used, the stability is somewhat reduced in spite of the higher sulfur content of the molecule. This is due to the less good compatibility of the polysulfide with smaller alkyl groups in the polyolefin.

Table 2

Stabilizer combination of 0.25% polysulfides and 0.25% of a mixture of about 60% diisobornyl-o-cresol

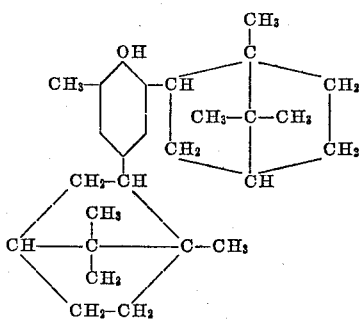

and about 40% o'- or p-mono-isobornyl-o-cresol:

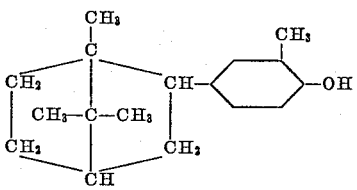

as phenolic component. (Total concentration of stabilizer combination: 0.5%.)

| Co-stabilizer plus isobornylated cresol (ph. c.) | Total concentration, percent | Embrittlement in days at 140° C. | Color of press plate after annealing |
|---|---|---|---|
| 0.25% bis-(octadecyl)-sulfide plus 0.25% ph. c. | 0.50 | 40 | Colorless. |
| 0.25% bis-(octadecyl)-disulfide plus 0.25% ph. c. | 0.50 | 45 | Do. |
| 0.25% bis-(octadecyl)-trisulfide plus 0.25% ph. c. | 0.50 | 48 | Do. |
| 0.25% bis-(octadecyl)-tetrasulfide plus 0.25% ph. c. | 0.50 | 50 | Do. |
| Isobornylated cresol (without addition) (ph. c.). | 0.50 | 3 | Do. |

Table 2 establishes as did Table 1 that the stability is increased with an increasing content of sulfur.

Table 3

Stabilizer combination of 0.25% polysulfides and 0.25% of a condensation product of camphene and 1,2,4-xylenol=ph. c.

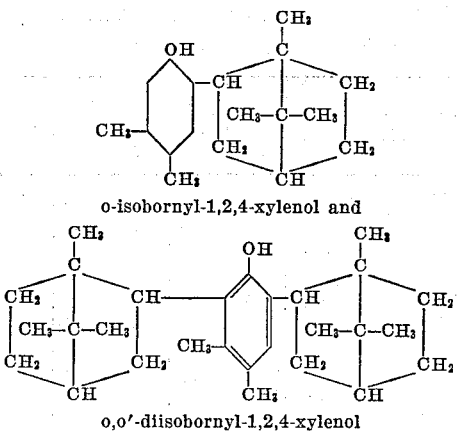

o-isobornyl-1,2,4-xylenol and o,o'-diisobornyl-1,2,4-xylenol

| 0.25% co-stabilizer plus 0.25% condensation product of camphene and 1,2,4-xylenol (ph. c.) | Total concentration, percent | Embrittlement in days at 140° C. | Color of press plate after annealing |
|---|---|---|---|
| 0.25% bis-(octadecyl)-sulfide plus 0.25% ph. c. | 0.50 | 5 | Colorless. |
| 0.25% bis-(octadecyl)-disulfide plus 0.25% ph. c. | 0.50 | 17 | Do. |

Table 3—Continued

| 0.25% co-stabilizer plus 0.25% condensation product of camphene and 1,2,4-xylenol (ph. c.) | Total concentration, percent | Embrittlement in days at 140° C. | Color of press plate after annealing |
|---|---|---|---|
| 0.25% bis-(octadecyl)-trisulfide plus 0.25% ph. c. | 0.50 | 29 | Colorless. |
| 0.25% bis-(octadecyl)-tetrasulfide plus 0.25% ph. c. | 0.50 | 30 | Do. |
| 0.5% ph. c. alone | 0.50 | 1 | Slightly yellowish. |

Table 4

Stabilizer combination of 0.25% dialkyl polysulfides and 0.25% 2,6-di-tert-butyl-p-cresol=ph. c. as phenolic component

| 0.25% co-stabilizer plus 0.25% 2,6-di-tert-butyl-p-cresol (ph. c.) | Total concentration, percent | Embrittlement in days at 140° C. | Color of press plate after annealing |
|---|---|---|---|
| 0.25% bis-(octadecyl)-sulfide plus 0.25% ph. c. | 0.50 | 8 | Colorless. |
| 0.25% bis-(octadecyl)-disulfide plus 0.25% ph. c. | 0.50 | 13 | Do. |
| 0.25% bis-(octadecyl)-trisulfide plus 0.25% ph. c. | 0.50 | 18 | Do. |
| 0.25% bis-(octadecyl)-tetrasulfide plus 0.25% ph. c. | 0.50 | 24 | Do. |
| 0.50% 2,6-di-tert-butyl-p-cresol=ph. c. | 0.50 | 1 | Do. |

The values obtained in Tables 3 and 4 for the time until embrittlement are slightly inferior to those obtained in Tables 1 and 2. However, Tables 3 and 4 show clearly that the stabilizing effect is increased as is the content of sulfur in the molecule.

We have also found that polyolefins can be stabilized so as to improve their age-resisting properties by admixing the polyolefins with a condensation product of iso-nonylphenol having a boiling point within the range of 161 to 221° C. under a pressure of 15 mm. of mercury, and acetone in admixture with polysulfides which contain hydrocarbon radicals. This combination improves the age-resisting properties of these polyolefins and their resistance to ultra-violet light.

The phenolic component (reaction product of iso-nonylphenol and acetone) to be used in accordance with the invention is obtained by proceeding as follows: 2 mols iso-nonylphenol having a boiling point within the range of 161 to 221° C. under a pressure of 15 mm. of mercury, are condensed at 60° C. for 48 hours with 1 mol acetone. During the whole period of reaction a gentle stream of dry hydrogen chloride is introduced into the reaction mixture. The water which forms is separated and the residual water is removed azeotropically with xylene. Any iso-nonylphenol which has not been reacted is removed by vacuum distillation. To bleach the brown residue, the latter is treated at 100 to 150° C. with bleaching earth. By filtering on a pressure filter, a slightly yellow, viscous oil is obtained which is referred to hereinafter as condensation product of iso-nonylphenol and acetone.

The following Tables 5 and 6 indicate the times until embrittlement at 140° C. for low pressure polypropylene containing 0.5% of the above stabilizer combination in a weight ratio of 1:1. The time until embrittlement is intended to mean the time in days after which a 1 mm. thick compressed sheet of polyolefin failed on bending.

Table 5

| Stabilizer | Concentration in percent | Embrittlement time in days at 140° C. | Color of press plate after annealing |
|---|---|---|---|
| Condensation product of iso-nonylphenol and acetone. | 0.25 | 3 | Colorless. |
|  | 0.50 | 5 | Do. |
| Bis-(octadecyl)-disulfide | 0.5 | 7 | Do. |
| Bis-(octadecyl)-trisulfide | 0.5 | 9 | Yellow. |
| Bis-(octadecyl)-tetrasulfide. | 0.5 | 9 | Do. |

Table 6

In Table 6, stabilizer combinations consisting of 0.25% of a condensation product of iso-nonylphenol and acetone and 0.25% of bis-(octadecyl)-disulfide, bis-(octadecyl)-trisulfide and bis-(octadecyl)-tetrasulfide, respectively, were used.

| 0.25% condensation product of iso-nonylphenol plus acetone— | Total concentration in percent | Embrittlement time in days at 140° C. | Color of press plate after annealing |
|---|---|---|---|
| Plus 0.25% bis-(octadecyl)-disulfide. | 0.5 | 53 | Colorless. |
| Plus 0.25% bis-(octadecyl)-trisulfide. | 0.5 | 56 | Do. |
| Plus 0.25% bis-(octadecyl)-tetrasulfide. | 0.5 | 60 | Do. |

A comparison of Tables 5 and 6 shows that the compounds when used alone have only a very moderate stabilizing effect. By combining the phenol with the polysulfide, however, the stabilizing effect is very strongly increased (synergism). Table 6 furthermore shows that the stabilizing effect rises with the sulfur content.

We claim:
1. Composition of matter comprising
   (a) a solid polymer prepared by reacting a member of the group consisting of ethylene, propylene, butylene, and mixtures thereof in the presence of a catalyst prepared from a mixture of an organo metallic compound and a compound of a heavy metal selected from the Group of IVB to VIB of the Periodic Table,
   (b) a condensation product obtained by condensation of 2 mols iso-nonylphenol and 1 mol acetone at 60° C. in the presence of hydrogen chloride, and
   (c) organo polysulfides having the formula

$$R-S_n-R$$

wherein R is a radical selected from the group consisting of alkyl radicals, aralkyl radicals and aryl radicals, the radicals containing 4 to 25 carbon atoms, and $n$ is a whole number from 2 to 4, said phenol and sulfide compounds being present in a combined amount of 0.001 to 5% by weight of the composition in a ratio of 5:1 to 1:5 parts by weight.

2. The composition of matter of claim 1 wherein the polysulfide is a bis-(octadecyl)-disulfide.

3. The composition of matter of claim 1 wherein the polysulfide is a bis-(octadecyl)-trisulfide.

4. The composition of matter of claim 1 wherein the polysulfide is a bis-(octadecyl)-tetrasulfide.

References Cited by the Examiner

UNITED STATES PATENTS

| 2,415,833 | 2/1947 | Mikeska et al. | 260—45.7 |
| 2,967,847 | 1/1961 | Hawkins et al. | 260—45.7 |
| 3,010,937 | 11/1961 | Roos et al. | 260—45.7 |
| 3,056,759 | 10/1962 | Mercier et al. | 260—45.7 |

LEON J. BERCOVITZ, *Primary Examiner.*

DONALD E. CZAJA, *Examiner.*

UNITED STATES PATENT OFFICE
CERTIFICATE OF CORRECTION

Patent No. 3,238,179                                             March 1, 1966

Claus Heuck et al.

It is hereby certified that error appears in the above numbered patent requiring correction and that the said Letters Patent should read as corrected below.

Column 1, before line 15, insert the following paragraph --;

This application is a continuation-in-part of application Serial No. 46,895, filed August 2, 1960.

Signed and sealed this 5th day of September 1967.

(SEAL)
Attest:

ERNEST W. SWIDER                                    EDWARD J. BRENNER
Attesting Officer                                             Commissioner of Patents